United States Patent Office 3,280,549
Patented Oct. 25, 1966

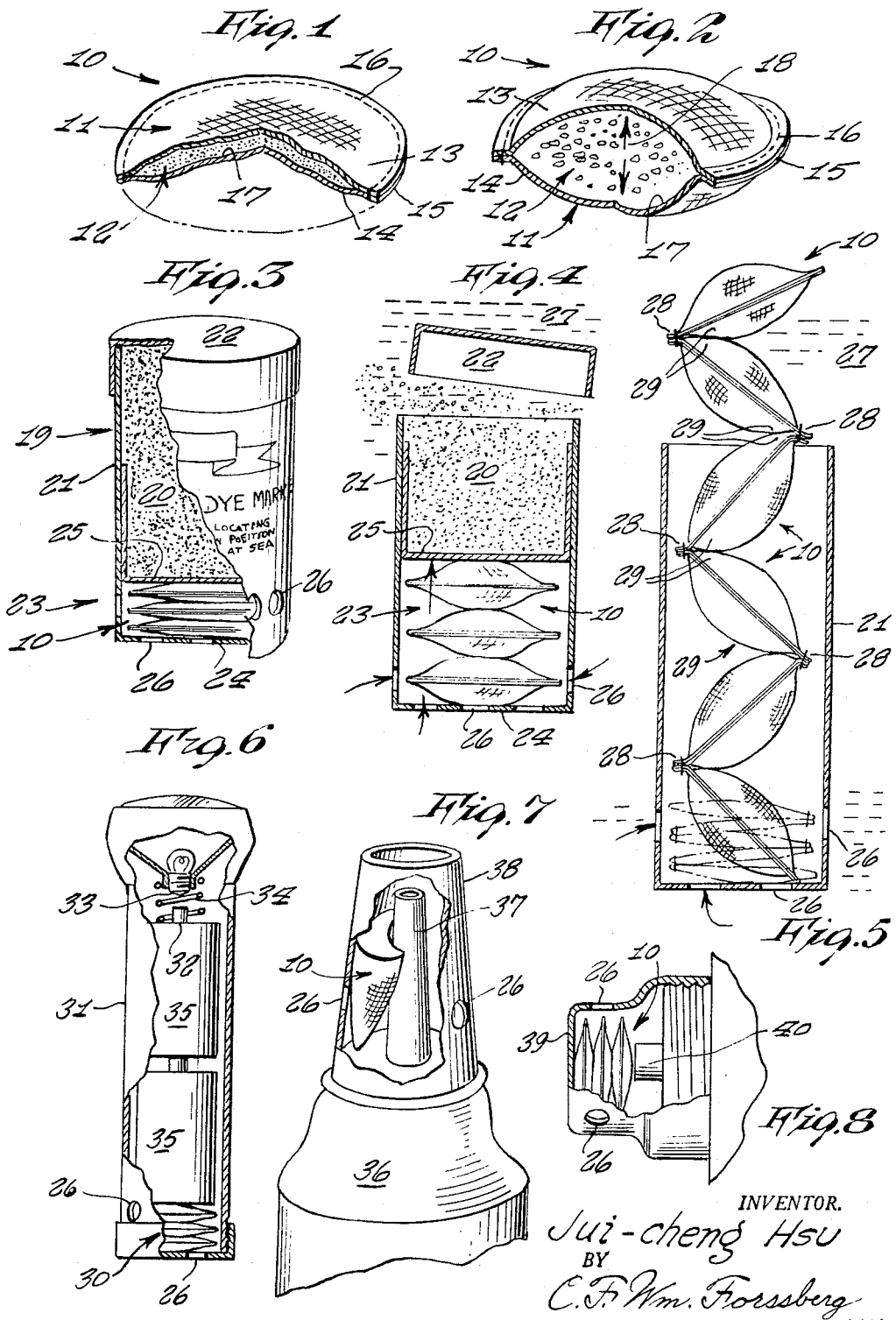

3,280,549
RELEASE MECHANISM POWERED BY WATER IMMERGED EXPANDABLE CARTRIDGE
Jui-cheng Hsu, Box 460, Grand Central Station, New York, N.Y.
Filed Sept. 23, 1965, Ser. No. 489,492
3 Claims. (Cl. 60—1)

This invention relates generally to release mechanisms. More specifically it relates to release mechanisms which become activated in water.

A principal object of the present invention is to provide a release mechanism having self contained means for becoming automatically activated when immerged in water, and accordingly being adaptable for use in various types of safety or emergency equipment such as aboard ships and ocean crossing airplanes.

Another object of the present invention is to provide a release mechanism having an expandable cartridge comprised of extremely simple parts which are not typical of ordinary mechanisms wherein machined parts are interfitted to accomplish mechanical movements, but wherein the cartridge comprises simply a fabric container containing an expandable powder.

Another object is to provide an expandable powder made from a plant called "*Sterculia lychnophora* Hance." and which if dried and ground or pulverized can expand to more than fifteen times its volume when immerged in water.

Other objects are to provide a release mechanism employing a water expandable cartridge that is simple in design, inexpensive to manufacture, rugged in construction, easy to use and efficient in operation.

These and other objects will be readily evident upon a study of the following specification and the accompanying drawing wherein:

FIGURE 1 is a perspective view of an expandable cartridge shown partly in cross section, the cartridge being illustrated prior to immersion in water.

FIGURE 2 is a similar view of an expandable cartridge shown subsequently after immersion in water, FIGURE 3 is a perspective view of a release mechanism illustrated prior to use and shown partly in cross section, FIGURE 4 is a cross sectional view thereof and shown after immersion within water, FIGURE 5 is a cross sectional view of a modified type of release mechanism, FIGURE 6 is a cross sectional view of a flash light shown employing the present expandable cartridge, FIGURE 7 is a fragmentary view of a pressure can employing the present expandable cartridge for automatically releasing the can content, and FIGURE 8 is a side view partly in cross section showing the expandable cartridge in cooperation with an electrical push button to activate various electrical equipment.

Referring now to the drawing in detail the numeral 10 represents an expandable cartridge according to the present invention wherein there is an envelope or pad 11 and an expandable powder 12 therein.

The pad 11 is comprised preferably of a mesh woven fabric and includes an upper panel 13 and a lower panel 14 which may be of any peripheral shape to accommodate any release mechanism but which preferably are of circular peripheral configuration as shown at edges 15. The panels are secured together adjacent the panel edges by a stitched thread 16 there around to form a central pocket 17 therebetween. Prior to completion of the stitching operation the powder 12 is inserted into the pocket.

The powder 12 is made from a plant called "*Sterculia lychnophora* Hance." The plant is dried and then ground or pulverized. The powder from this plant has the property of being expandable to over fifteen volumes when immerged in water. Accordingly, for practical use the pad is designed so as to confine the expansion into a singular direction useable in release mechanisms. The stitched thread prevents lateral spread and accordingly the cartridge is expandable in a transverse direction thereto as indicated by the arrows 18 in FIGURE 2.

In practical use as shown in FIGURES 3 to 8 the cartridge is adaptable for various types of release mechanisms only a few of which are here illustrated.

FIGURES 3 and 4 show an adaptation thereof for aircraft or ship safety equipment. The container 19 contains dye 20 for coloring sea water so as to aid in locating persons in distress at sea or locating the position of astronauts whose capsule has dropped into the sea. The container may be used instead for shark repellent or the like, and it includes a cylindrical case 21, a cover 22 slidable over an open end thereof, and a release mechanism 23 adajacent an opposite end wall 24. The release mechanism includes a plurality of expandable cartridges adjacent each other, a slidable panel 25 between the cartridges and dye powder, and several openings 26 in the case for admitting sea water to the cartridges and automatically causing them to expand thus forcing the panel and dye to slide upwardly forcing the cover to slide off the case, as shown in FIGURE 4, and disperse the dye into the sea water 27. Thus without any attention thereto to the dye marker is put to use upon immediate contact with sea water.

It is to be noted that any type of other pad material may be used that is strong enough to prevent bursting and which will admit water therethrough but prevent the powder to pass through. Likewise any other edge seal different, than stitching may be used and the location of the cartridges may be adjacent the cover or anywhere between opposite ends of a container.

It is to be noted that the greater the amount of powder 12 in the cartridge the faster is the expansion.

In a modified construction shown in FIGURE 5 the cartridges are secured by a stitch 28 at opposite points on the peripheral edge to adjacent cartridges. In operative use when the cartridge expands, the expanded shoulders 29 of the cartridges abut each other causing the cartridges to pivot relative to one another about the stitch 28. Thus the cartridge assembly 29 stretches over a greater length, and the expansion is quicker to release a container cap.

In FIGURE 6 the release mechanism 30 is contained within a flash light 31 to cause battery pole 32, normally separated from a lamp pole 33 by a compression coil spring 34, to slide upwardly against the spring action and contact pole 33 thus closing a circuit with batteries 35 and light the lamp.

In FIGURE 7 a pressure type can 36 having a tiltable spout 37 which is activated when tilted, includes a fixed sleeve 38 having an expandable cartridge between one side of the spout and the sleeve to cause the spout to tilt upon contact wtih sea water.

In FIGURE 8 the release mechanism comprises several cartridges between a stationary end cap wall 39 and a retractable push button 40 which activates various electrical alarm circuits.

While various changes may be made in the detail construction such changes will be in the spirit and scope of the appended claims.

I claim:
1. A release mechanism contained within a container between a stationary wall and a movable member comprising a plurality of separate automatically expandable cartridges, said cartridges being in adjacent alignment relative to one another, and said cartridges having self contained means to expand upon contact with water.

2. In a release mechanism the combination as set forth in claim 1 wherein each of said cartridges comprises a pad of fabric material and an expandable powder within said pad, said pad being comprised of a pair of circular panels secured together at their edges to confine expansion to a transverse direction which is along the axis of said pad.

3. In a release mechanism the combination as set forth in claim 2 wherein said powder is comprised of *Sterculia lynchnophora* Hance.

References Cited by the Examiner

UNITED STATES PATENTS

| 1,476,387 | 12/1923 | Atwell | 9—9 |
| 2,817,350 | 12/1957 | Bradner et al. | 60—1 X |
| 2,841,983 | 7/1958 | Vernet | 60—23 X |
| 2,991,763 | 7/1961 | Marette | 92—89 X |

EDGAR W. GEOGHEGAN, *Primary Examiner.*